(12) United States Patent
Mitsushima et al.

(10) Patent No.: US 11,390,958 B2
(45) Date of Patent: Jul. 19, 2022

(54) ALKALINE WATER ELECTROLYSIS METHOD AND ALKALINE WATER ELECTROLYSIS ANODE

(71) Applicants: DE NORA PERMELEC LTD, Fujisawa (JP); NATIONAL UNIVERSITY CORPORATION YOKOHAMA NATIONAL UNIVERSITY, Yokohama (JP)

(72) Inventors: Shigenori Mitsushima, Yokohama (JP); Yoshiyuki Kuroda, Yokohama (JP); Takeshi Nishimoto, Yokohama (JP)

(73) Assignees: DE NORA PERMELEC LTD, Fujisawa (JP); NATIONAL UNIVERSITY CORPORATION YOKOHAMA NATIONAL UNIVERSITY, Yokohama (JP)

( * ) Notice: Subject to any disclaimer, the term of this patent is extended or adjusted under 35 U.S.C. 154(b) by 0 days.

(21) Appl. No.: 17/433,474

(22) PCT Filed: Mar. 11, 2020

(86) PCT No.: PCT/JP2020/010477
§ 371 (c)(1),
(2) Date: Aug. 24, 2021

(87) PCT Pub. No.: WO2020/184607
PCT Pub. Date: Sep. 17, 2020

(65) Prior Publication Data
US 2022/0136115 A1 May 5, 2022

(30) Foreign Application Priority Data
Mar. 12, 2019 (JP) ............................. JP2019-045008

(51) Int. Cl.
*C25B 11/085* (2021.01)
*C25B 1/04* (2021.01)
(Continued)

(52) U.S. Cl.
CPC .............. *C25B 11/085* (2021.01); *C25B 1/04* (2013.01); *C25B 11/061* (2021.01);
(Continued)

(58) Field of Classification Search
CPC ....... C25B 1/04; C25B 11/075; C25B 11/085; C25B 11/051
See application file for complete search history.

(56) References Cited

U.S. PATENT DOCUMENTS

2016/0237578 A1  8/2016  Ichikawa et al.
2019/0078220 A1  3/2019  Kato et al.

FOREIGN PATENT DOCUMENTS

CN  106563450     4/2017
CN  106563450 A  * 4/2017
(Continued)

OTHER PUBLICATIONS

Korean Office Action, issued in the corresponding Korean patent application No. 10-2021-7030131, dated Oct. 26, 2021, with translation, 6 pages.
(Continued)

*Primary Examiner* — Nicholas A Smith
(74) *Attorney, Agent, or Firm* — Hamre, Schumann, Mueller & Larson, P.C.

(57) ABSTRACT

An object of the present invention is to provide an electrolysis technique such that the electrolysis performance is unlikely to be deteriorated, and excellent catalytic activity is retained stably over a long period of time even when electric power having a large output fluctuation, such as renewable energy, is used a power source, and this object is realized by
(Continued)

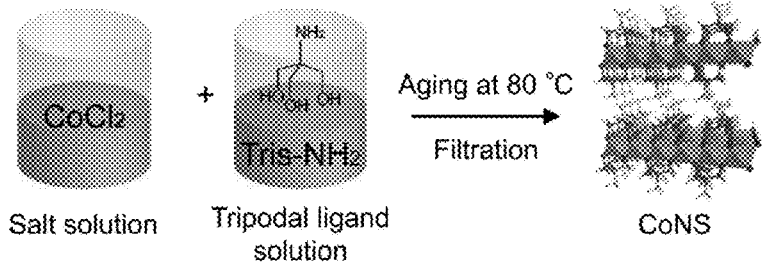

| Co (wt%) | C (wt%) | H (wt%) | N (wt%) | Cl (wt%) | Oxidation number |
|---|---|---|---|---|---|
| 38.9 | 14.7 | 5.7 | 3.9 | 1.1 | +2.2 | an alkaline water electrolysis method, in which an electrolytic solution obtained by dispersing a catalyst containing a hybrid cobalt hydroxide nanosheet (Co-NS) being a composite of a metal hydroxide and an organic substance is supplied to an anode chamber and a cathode chamber that form an electrolytic cell, and the electrolytic solution is used for electrolysis in each chamber in common, and an alkaline water electrolysis anode.

6 Claims, 6 Drawing Sheets

(51) Int. Cl.
    *C25B 11/091*     (2021.01)
    *C25B 15/029*     (2021.01)
    *C25B 15/08*     (2006.01)
    *C25B 11/061*     (2021.01)
(52) U.S. Cl.
    CPC .......... *C25B 11/091* (2021.01); *C25B 15/029* (2021.01); *C25B 15/08* (2013.01)

(56) References Cited

FOREIGN PATENT DOCUMENTS

| CN | 109852992 A | * | 6/2019 |
|---|---|---|---|
| JP | 2015-086420 | | 5/2015 |
| JP | 2017-190476 | | 10/2017 |
| WO | 2017/167373 | | 10/2017 |

OTHER PUBLICATIONS

Kuroda et al.,"Direct Synthesis of Highly Designable Hybrid Metal Hydroxide Nanosheets by Using Tripodal Ligands as One-Size-Fits-All Modifiers", Nanostructures, Chemistry a European Journal, Jan. 14, 2027, vol. 23, pp. 5023-5032.
Barwe et al., "Overcoming the Instability of Nanoparticle-Based Catalyst Films in Alkaline Electrolyzers by using Self-Assembling and Self-Healing Films", Electrocatalysis, Analytical Chemistry—Center for Electrochemical Sciences, Angew. Chem. Int. Ed., 2017, vol. 56, pp. 8573-8577.
International Search Report, issued in the corresponding PCT application No. PCT/JP2020/010477, dated Jun. 2, 2020, 5 pages (including translation).
P.W.T. Lu et al., "Electrochemical-Ellipsometric Studies of Oxide Film Formed on Nickel during Oxygen Evolution", J. Electrochem. Soc., Electrochemical Science and Technology, vol. 125, No. 9, Sep. 1978, pp. 1416-1422.
Bowen et al., "Developments in Advanced Alkaline Water Electrolysis", Int. J. Hydrogen Energy, vol. 9, No. 1/2, 1984, pp. 59-66.
Fujita et al., "Electrocatalytic Activity and Durability of LixNi2−xO2/Ni Electrode Prepared by Oxidation with LiOH Melt for Alkaline Water Electrolysis", Electrocatalysis No. 8, 2017, pp. 422-429.

* cited by examiner

*Synthetic method*

| Co (wt%) | C (wt%) | H (wt%) | N (wt%) | Cl (wt%) | Oxidation number |
|---|---|---|---|---|---|
| 38.9 | 14.7 | 5.7 | 3.9 | 1.1 | +2.2 |

$CoO_{0.19}(OH)_{0.33}Cl_{0.23}(Tris-NH_2)_{0.36}(Tris-NH_3^+)_{0.06}(CO_3^{2-})_{0.03} \cdot 1.31H_2O$

ALKALINE WATER ELECTROLYSIS METHOD AND ALKALINE WATER ELECTROLYSIS ANODE

TECHNICAL FIELD

The present invention relates to an alkaline water electrolysis method and an alkaline water electrolysis anode. In more detail, the present invention provides a technique such that stable retention of the catalytic activity of an oxygen generation anode over a long period of time is realized by simple means of supplying a common electrolytic solution having particular constitution to an anode chamber and a cathode chamber that form an electrolytic cell, and thereby alkaline water electrolysis in which the electrolysis performance is unlikely to be deteriorated and which is stable for a long period of time can be performed even when electric power having a large output fluctuation, such as renewable energy, is used as a power source.

BACKGROUND ART

Hydrogen is secondary energy which is suitable for storage and transportation and has small environmental load, and therefore a hydrogen energy system using hydrogen as an energy carrier has been attracting attention. Currently, hydrogen is mainly produced by steam reforming of fossil fuel, or the like. However, from the viewpoint of problems of global warming and exhaustion of fossil fuel, hydrogen production by water electrolysis from renewable energy, such as solar power generation and wind power generation, has become important in generic technology. Water electrolysis is low cost, suitable for enlargement of scale, and therefore is a predominant technique for hydrogen production.

Current practical water electrolysis is largely divided into two. One is alkaline water electrolysis, in which a high-concentration alkali aqueous solution is used for an electrolyte. The other is solid polymer type water electrolysis, in which a solid polymer electrolyte membrane (SPE) is used for an electrolyte. When large-scale hydrogen production is performed by water electrolysis, it is said that alkaline water electrolysis, in which an inexpensive material, such as an iron group metal including nickel and the like, is used, is more suitable than solid polymer type water electrolysis, in which an electrode using a large amount of an expensive noble metal is used.

With respect to the high-concentration alkali aqueous solution, electric conductivity becomes high as the temperature increases, but corrosiveness also becomes high. Therefore, the upper limit of the operation temperature is controlled to about 80 to about 90° C. The electrolytic cell voltage has been improved to 2 V or less at a current density of 0.6 $Acm^{-2}$ by the development of constitutional materials and various piping materials for an electrolytic bath, which are high-temperature resistant and resistant to a high-concentration alkali aqueous solution, and the development of a low-resistivity separator and an electrode which has an enlarged surface area and has a catalyst applied thereon.

A nickel-based material which is stable in a high-concentration alkali aqueous solution is used as an alkaline water electrolysis anode, and it has been reported that in the case of alkaline water electrolysis using a stable power source, a nickel-based anode has a life of several decades or longer (Non-Patent Literatures 1 and 2). However, when renewable energy is used as a power source, severe conditions, such as sudden start/stop and abrupt load fluctuation, are frequent, and therefore deterioration in performance of the nickel-based anode has been problematic (Non-Patent Literature 3).

Both of the reaction of producing a nickel oxide and the reaction of reducing the produced nickel oxide progress on a metal surface. Therefore, elimination of an electrode catalyst formed on the metal surface is facilitated with the progress of these reactions. When the electric power for electrolysis is not supplied, the electrolysis stops, and the nickel-based anode is retained at a potential lower than the oxygen generation potential (1.23 V vs. RHE) and higher than the potential of a hydrogen generation cathode, which is a counter electrode, (0.00 V vs. RHE). In the electrolytic cell, electromotive force due to various chemical species is generated, so that the anode potential is retained low, and the reaction of reducing the nickel oxide is facilitated by the progress of a battery reaction.

A current generated by the battery reaction leaks through piping that connects cells in the case of, for example, an electrolytic bath obtained by combining a plurality of cells, such as an anode chamber and a cathode chamber. Examples of the countermeasure for preventing such leakage of a current include a method of allowing a minute current to flow continuously during suspension. However, to allow a minute current to flow continuously during suspension, special power source control is needed, and oxygen and hydrogen are generated at all times, and therefore there is a problem that excessive labor has to be done in terms of operation management. In addition, preventing a battery reaction by removing liquid immediately after suspension for the purpose of intentionally avoiding a reverse current state is possible, but it is difficult to say that such measure is always an adequate approach when operation with electric power having a large output fluctuation, such as renewable energy, is supposed.

In the past, platinum group metals, platinum group metal oxides, valve metal oxides, iron group oxides, lanthanide group metal oxides, and the like have been utilized as a catalyst for oxygen generation anode (anode catalyst) which is used for alkaline water electrolysis. As other anode catalysts, alloy-based anode catalysts using nickel as a base, such as Ni—Co and Ni—Fe; nickel having an enlarged surface area; spinel-based anode catalysts, such as $Co_3O_4$ and $NiCo_2O_4$; perovskite-based electrically conductive oxides (ceramic materials), such as $LaCoO_3$ and $LaNiO_3$; noble metal oxides; oxides containing a lanthanide group metal and a noble metal; and the like have also been known (Non-Patent Literature 3).

In recent years, an alkaline water electrolysis anode obtained by forming a lithium-containing nickel oxide catalyst layer containing lithium and nickel in a predetermined molar ratio on the surface of a nickel substrate (Patent Literature 1) and an alkaline water electrolysis anode obtained by forming a catalyst layer containing a nickel-cobalt-based oxide, and an iridium oxide or a ruthenium oxide on the surface of a nickel substrate (Patent Literature 2) have been proposed as an oxygen generation anode which is used for high-concentration alkaline water electrolysis.

CITATION LIST

Patent Literature

Patent Literature 1: Japanese Patent Laid-Open No. 2015-86420
Patent Literature 2: Japanese Patent Laid-Open No. 2017-190476

Non-Patent Literature

Non-Patent Literature 1: P. W. T. Lu, S. Srinivasan, J.Electrochem.Soc., 125,1416(1978)
Non-Patent Literature 2: C. T. Bowen, Int.J.Hydrogen Energy, 9,59(1984)
Non-Patent Literature 3: S. Mitsushima et al., Electrocatalysis 2017, 8, 422.

SUMMARY OF INVENTION

Technical Problem

However, according to studies conducted by the present inventors, there has been a problem that even in the alkaline water electrolysis anodes proposed in Patent Literatures 1 and 2, the performance is likely to be deteriorated, making it difficult to use the anode stably over a long period of time when electric power having a large output fluctuation, such as renewable energy, is used as a power source. To solve such a problem, enhancement of durability of an anode against potential fluctuation due to sudden start/stop and abrupt fluctuation in potential load is required.

The present invention has been completed in view of such a problem of the conventional techniques, and an object of the present invention is to provide an electrolysis electrode excellent in durability such that the electrolysis performance is unlikely to be deteriorated, and excellent catalytic activity is retained stably over a long period of time even when electric power having a large output fluctuation, such as renewable energy, is used as a power source. Further, the ultimate goal of the present invention is to provide an operation method such that alkaline water electrolysis in which the electrolysis performance is unlikely to be deteriorated and which is stable over a long period of time can be performed by using the excellent electrolysis electrode even when electric power having a large output fluctuation, such as renewable energy, is used as a power source.

Solution to Problem

The objects are achieved by the present invention described below. That is, the present invention provides the following alkaline water electrolysis method.

[1] An alkaline water electrolysis method including supplying an electrolytic solution obtained by dispersing a catalyst containing a hybrid cobalt hydroxide nanosheet (hereinafter, sometimes abbreviated as Co-NS) being a composite of a metal hydroxide and an organic substance to an anode chamber and a cathode chamber that form an electrolytic cell, and using the electrolytic solution for electrolysis in each chamber in common.

[2] An alkaline water electrolysis method including: supplying an electrolytic solution obtained by dispersing a catalyst comprising a hybrid cobalt hydroxide nanosheet (Co-NS) being a composite of a metal hydroxide and an organic substance to an anode chamber and a cathode chamber that form an electrolytic cell, and using the electrolytic solution for electrolysis in each chamber in common; and performing electrolytic deposition of the Co-NS in the electrolytic cell during operation to electrolytically deposit the Co-NS on a surface of an electrically conductive substrate that forms an oxygen generation anode and has the catalyst layer formed on a surface thereof, thereby recovering and improving electrolysis performance.

Preferred embodiments of the alkaline water electrolysis method include the followings.

[3] The alkaline water electrolysis method according to [1] or [2], wherein the Co-NS has a layered molecular structure having a size of 10 to 100 nm.

[4] The alkaline water electrolysis method according to [2] or [3], wherein a condition of electrolytically depositing the Co-NS is to retain the electrically conductive substrate in a potential range of 1.2 to 1.8 V vs. RHE.

[5] The alkaline water electrolysis method according to any one of [1] to [4], wherein a Co-NS dispersion liquid having a concentration of 10 to 100 g/L is used as the electrolytic solution obtained by dispersing the Co-NS, and the concentration of the Co-NS dispersion liquid added to the electrolytic solution is adjusted in such a way as to be within a range of 0.1 to 5 mL/L.

Further, the present invention provides as another embodiment the following alkaline water electrolysis anode that is useful when applied to the alkaline water electrolysis method.

[6] An alkaline water electrolysis anode that performs oxygen generation, the alkaline water electrolysis anode provided with: an electrically conductive substrate having a surface containing nickel or a nickel base alloy; an intermediate layer formed on the surface of the electrically conductive substrate, the intermediate layer containing a lithium-containing nickel oxide represented by compositional formula $Li_xNi_{2-x}O_2$ wherein $0.02 \leq x \leq 0.5$; and a Co-NS catalyst layer formed on a surface of the intermediate layer, the catalyst layer containing a hybrid cobalt hydroxide nanosheet (Co-NS) being a composite of a metal hydroxide and an organic substance.

Advantageous Effects of Invention

The present invention enables providing an alkaline water electrolysis anode (sometimes referred to as oxygen generation anode) that performs oxygen generation, the alkaline water electrolysis anode being such that the electrolysis performance is unlikely to be deteriorated during electrolysis operation, and excellent catalytic activity is retained stably over a long period of time even when electric power having a large output fluctuation, such as renewable energy, is used as a power source. Further, the present invention can provide an industrially useful alkaline water electrolysis method such that stable retention of the catalytic activity of the oxygen generation anode over a long period of time can be realized by simple means of supplying a common electrolytic solution to an anode chamber and a cathode chamber, and alkaline water electrolysis in which the electrolysis performance is unlikely to be deteriorated and which is stable over a long period of time can be performed even when electric power having a large output fluctuation, such as renewable energy, is used as a power source.

DESCRIPTION OF EMBODIMENTS

Hereinafter, the present invention will be described in detail giving preferred embodiments. Under the circumstances of the previously mentioned conventional techniques, there are proposals on the technique given below. For example, in recent years, a technique on a stable catalyst layer having self-recovering ability based on self-assembly of the catalyst particles on the spot during electrolysis operation has been proposed in E. Ventosa et al., Angew. Chem. Int. Ed. 2017, 56, 8573. In this conventional technique, the catalyst particles are added to an electrolyte to form a suspension, and particles having a negatively charged surface adhere to an anode, and on the other hand, particles having a positively charged surface adhere to a cathode. And those described below have been disclosed. The catalyst particles have self-recovering properties as long as sufficient catalyst particles are present in the electrolyte. In an example where NiFe-LDH (NiFe-layered double hydroxide) and a nano-powder of a $Ni_xB$ catalyst are used for the anode and the cathode respectively, the cell voltage was lowered only when $Ni_xB$ was added to the catholyte. A film of dense particles was observed on the cathode, but film formation was not observed on the anode. Only the effect of $Ni_xB$ as a cathode catalyst was ascertained, and there was not any effect on the anode.

However, when an anode has an active catalyst layer, whether the catalytic effect as disclosed in the conventional technique given above can be expected or not has not so far been disclosed. On the other hand, a dispersed self-recovering catalyst moves not only to an anode but also to a cathode in operation methods in practical electrolytic cells, and therefore the influence of the catalyst on the cathode is an important issue. However, particles that exhibit an effect on both electrodes and function as a stable catalyst have not been reported yet.

The present inventors have conducted diligent studies in order to solve the problem. As a result, the present inventors have found that a hybrid cobalt hydroxide nanosheet (Co-NS) obtained based on a novel production method recently disclosed in Y. Kuroda et al., Chem. Eur. J. 2017, 23, 5032 can function as an exceptionally durable, self-organized electrode catalyst, and by using this sheet, the above-described problem in the conventional technique can be solved, and completed the present invention. Specifically, the present inventors have found that when the hybrid cobalt hydroxide nanosheet (Co-NS) being a composite of a metal hydroxide and an organic substance is used by dispersing it in an electrolytic solution and utilized as a self-organized catalyst, thereby the Co-NS acts as a catalyst and an anti-corrosion film and can significantly improve the durability of a Ni-based anode against potential fluctuation, and further, the Co-NS does not affect an active cathode particularly and can be applied to an electrolytic cell.

[Anode]

Figure 1:
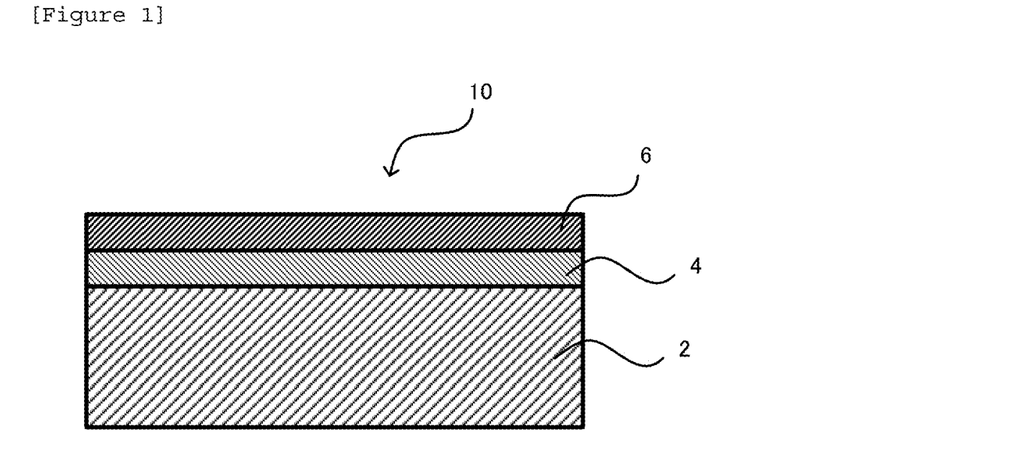
FIG. 1 is a section view schematically showing one embodiment of an oxygen generation anode that is used in an alkaline water electrolysis method of the present invention.

FIG. 1 is a section view schematically showing one embodiment of an alkaline water electrolysis anode 10 that is used in the alkaline water electrolysis method of the present invention and performs oxygen generation. As shown in FIG. 1, the oxygen generation anode of the present embodiment is provided with an electrically conductive substrate 2, an intermediate layer 4 formed on the surface of the electrically conductive substrate 2, and a catalyst layer 6 formed on the surface of the intermediate layer 4. Hereinafter, the details on the oxygen generation anode that is used in the alkaline water electrolysis method of the present invention will be described with reference to the drawings.

<Electrically Conductive Substrate>

The electrically conductive substrate 2 is an electric conductor that conducts electricity for electrolysis and is an element having a function as a carrier that carries the intermediate layer 4 and the catalyst layer 6. At least a surface of the electrically conductive substrate 2 (the surface on which the intermediate layer 4 is formed) is formed with nickel or a nickel base alloy. That is, the whole of the electrically conductive substrate 2 may be formed with nickel or a nickel base alloy, or only the surface of the electrically conductive substrate 2 may be formed with nickel or a nickel base alloy. Specifically, the electrically conductive substrate 2 may be, for example, such that a coating of nickel or a nickel base alloy is applied on the surface of a metal material, such as iron, stainless steel, aluminum, or titanium, by plating or the like.

The thickness of the electrically conductive substrate 2 is preferably 0.05 to 5 mm. The shape of the electrically conductive substrate is preferably a shape having an opening for removing bubbles of oxygen, hydrogen, and the like to be generated. For example, an expanded mesh or a porous expanded mesh can be used as the electrically conductive substrate 2. When the electrically conductive substrate has a shape having an opening, the aperture ratio of the electrically conductive substrate is preferably 10 to 95%.

The oxygen generation anode that is used in the alkaline water electrolysis method of the present invention can be obtained by, for example, forming the intermediate layer 4 and the catalyst layer 6 on the surface of the above-described electrically conductive substrate 2 as follows.

(Pre-Treatment Step)

The electrically conductive substrate 2 is preferably subjected to a chemical etching treatment in advance for the purpose of removing contamination particles of a metal, an organic substance, and the like on the surface before performing steps of forming the intermediate layer 4 and the catalyst layer 6. The consumption of the electrically conductive substrate by the chemical etching treatment is preferably set to about 30 $g/m^2$ or more and about 400 $g/m^2$ or less. In addition, the surface of the electrically conductive substrate is preferably subjected to a roughening treatment in advance for the purpose of enhancing the adhesiveness with the intermediate layer. Examples of the means for the roughening treatment include a blast treatment in which a powder is sprayed, an etching treatment using an acid that can dissolve the substrate, and plasma spraying.

<Intermediate Layer>

The intermediate layer 4 is a layer formed on the surface of the electrically conductive substrate 2. The intermediate layer 4 suppresses corrosion or the like of the electrically conductive substrate 2 and fixes the catalyst layer 6 stably to the electrically conductive substrate 2. In addition, the intermediate layer 4 also serves as a function of supplying a current quickly to the catalyst layer 6. The intermediate layer 4 may be formed with, for example, a lithium-containing nickel oxide represented by composition formula $Li_xNi_{2-x}O_2$ (0.02≤x≤0.5). When x in the compositional formula is less than 0.02, the electric conductivity is insufficient. On the other hand, when x exceeds 0.5, the physical strength and the chemical stability are lowered. The intermediate layer 4 formed with a lithium-containing nickel oxide represented by the compositional formula has enough electric conductivity for electrolysis, and exhibits excellent physical strength and chemical stability even after the use fora long period of time.

The thickness of the intermediate layer 4 is preferably 0.01 μm or more and 100 μm or less, and more preferably 0.1 μm or more and 10 μm or less. When the thickness of the intermediate layer is less than 0.01 μm, the above-mentioned functions are not obtained sufficiently. On the other hand, even if the thickness of the intermediate layer is set in such a way as to exceed 100 μm, the above-mentioned functions are not exhibited because the voltage loss due to the resistance in the intermediate layer is large, and it is somewhat disadvantageous in terms of production costs or the like in some cases.

(Application Step for Forming Intermediate Layer 4)

In the application step, an aqueous solution of a precursor containing a lithium ion and a nickel ion is applied on the surface of the electrically conductive substrate 2. The intermediate layer 4 is formed by a so-called thermal decomposition method. When the intermediate layer is formed by the thermal decomposition method, an aqueous solution of a precursor of the intermediate layer is first prepared. As the precursor containing a lithium component, a known precursor, such as lithium nitrate, lithium carbonate, lithium chloride, lithium hydroxide, and a lithium carboxylate, can be used. Examples of the lithium carboxylate include lithium formate and lithium acetate. As the precursor containing a nickel component, a known precursor, such as nickel nitrate, nickel carbonate, nickel chloride, and a nickel carboxylate, can be used. Examples of the nickel carboxylate include nickel formate and nickel acetate. It is particularly preferable to use at least one of a lithium carboxylate and a nickel carboxylate in particular as the precursor because thereby a dense intermediate layer can be formed even when calcination is performed at a low temperature, as will be mentioned later.

The thermal treatment temperature at the time when the intermediate layer 4 is formed by the thermal decomposition method can appropriately be set. When the decomposition temperature of the precursor and the production costs are taken into consideration, the thermal treatment temperature is preferably set to 450° C. or higher and 600° C. or lower. The thermal treatment temperature is more preferably set to 450° C. or higher and 550° C. or lower. For example, the decomposition temperature of lithium nitrate is about 430° C., and the decomposition temperature of the nickel nitrate is about 373° C. When the thermal treatment temperature is set to 450° C. or higher, thereby each component can more surely be decomposed. When the thermal treatment temperature is set in such a way as to exceed 600° C., the oxidation of the electrically conductive substrate 2 easily progresses, and the electrode resistance increases to bring about an increase in the voltage loss in some cases. The thermal treatment temperature may appropriately be set taking the reaction rate, the productivity, the oxidation resistance at the surface of the catalyst layer, and the like into consideration.

By appropriately setting the number of times of application of the aqueous solution in the previously mentioned application step, the thickness of the intermediate layer 4 to be formed can be controlled. Note that the application and drying of the aqueous solution may be repeated for every layer to form the uppermost layer, and the thermal treatment may thereafter be performed on the whole layers. In addition, the application of the aqueous solution and the thermal treatment (pre-treatment) may be repeated for every layer to form the uppermost layer, and the thermal treatment may thereafter be performed on the whole layers. The temperature of the pre-treatment and the temperature of the thermal treatment on the whole may be the same or different. The time for the pre-treatment is preferably made shorter than the time for the thermal treatment on the whole layers.

<Catalyst Layer>

The embodiment of the oxygen generation anode that is used in the alkaline water electrolysis method of the present invention is preferably made such that the catalyst layer 6 containing a particular catalyst component is formed on the outermost surface of the electrically conductive substrate 2. By constituting the catalyst layer 6 in this way and applying the catalyst layer 6 to alkaline water electrolysis, the excellent effects of the present invention can be exhibited. Hereinafter, the catalyst layer that is effective and useful in the present invention will be described.

(Catalyst Component)

The hybrid cobalt hydroxide nanosheet (Co-NS) that is used in the present invention, that is a catalyst component that characterizes the present invention, and that is a composite of a metal hydroxide and an organic substance can simply be produced by, for example, in the manner as described below. Firstly, an aqueous solution of a tripodal ligand (Tris-$NH_2$) and an aqueous solution of $CoCl_2$ are mixed at room temperature and reacted at 80° C. for 24 hours. Thereafter, a reaction product is subjected to vacuum filtration, washed two times with pure water, and dried again at 80° C. to obtain powdery Co-Tris-$NH_2$ having a layered structure. In 1 mL of ion-exchanged water, 50 mg of this powder is dispersed and subjected to an ultrasonic treatment to obtain a Co-NS dispersion liquid having a concentration of 50 g/L. As an electrolytic solution which is used in the present invention and in which the Co-NS is dispersed, an electrolytic solution prepared by adding the "Co-NS dispersion liquid", obtained by the production method as described above, in such a way the added concentration is appropriate is used.

Figure 2:
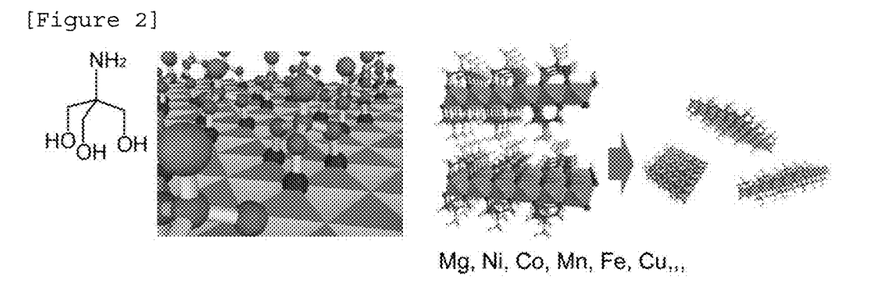
FIG. 2 is a diagram showing one example of a layered molecular structure of Co-Tris-$NH_2$ having a tripodal ligand, the Co-Tris-$NH_2$ being a catalyst component that is used in the present invention.
Figure 3:
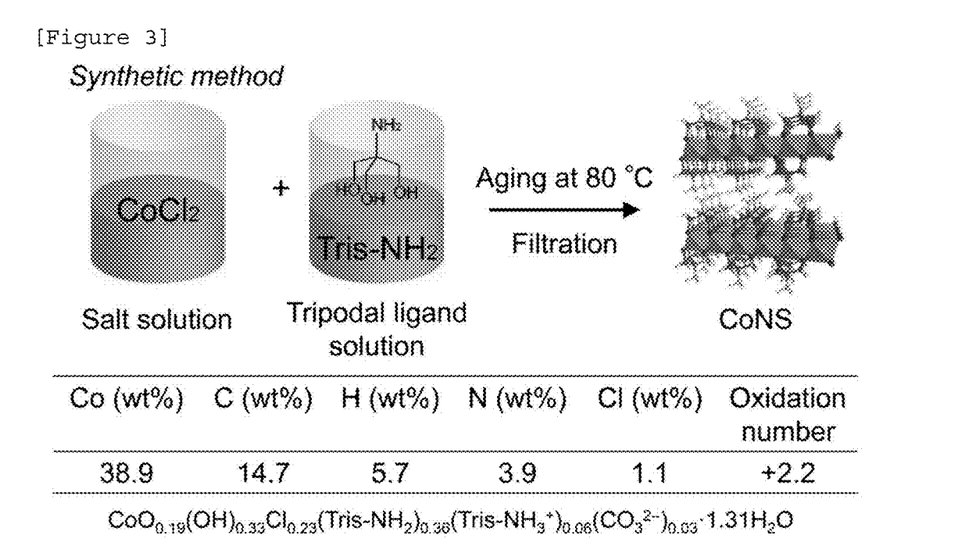
FIG. 3 is a diagram showing a production method example, a composition, and a structural formula of a catalyst layer having a layered structure on a surface of an electrically conductive substrate of an oxygen generation anode that is used in the present invention.

As schematically shown in FIG. 2, the Co-NS has a layered molecular structure of Co-Tris-$NH_2$ having a tripodal ligand, and contains a brucite layer to which Tris molecules are covalently fixed. Modification with Tris-$NH_2$ enhances the ability of releasing and dispersing layered cobalt hydroxide in an electrolytic solution. It has been ascertained from a TEM image and an AFM image that the molecular structure of the Co-NS obtained above is in the form of a nanosheet having a thickness of about 1.3 nm and a size in the transverse direction within a range of 10 to 100 nm. The nanosheet, when used in the alkaline water electrolysis method of the present invention, preferably has a size of length (major diameter) in a range of 10 to 100 nm. It is not preferable that the length is equal to or longer than this because the efficiency of electrolytic deposition is lowered to make it difficult to exhibit effects of an improvement in and recovery of overpotential in some cases.

(Method for Forming Catalyst Layer)

The method for forming the catalyst layer 6 containing the Co-NS will be mentioned. A 1.0 M KOH aqueous solution is used as an electrolytic solution. It is preferable to perform potential manipulation in the electrolytic solution for the purpose of cleaning the surface of the electrically conductive substrate 2 on which the catalyst layer is formed. For example, cyclic manipulation of potential (—0.5 to 0.5 V vs. RHE, 200 mVs$^{-1}$, 200 cycles) is performed. Thereafter, the Co-NS dispersion liquid obtained as previously mentioned and having a concentration of 10 to 100 g/L is used, and by lowering the dispersibility of the Co-NS on the surface of an electrode through oxidation of a hydroxide layer or oxidative decomposition of surface organic groups, the Co-NS is deposited on the surface of the electrode by electrolysis of (0.5 to 1.8 V vs. RHE, 200 mV/s, 200 cycles) with an electrolytic solution obtained by, for example, in the case where a Co-NS dispersion liquid having a concentration of 50 g/L is used, mixing the Co-NS dispersion liquid in a ratio of about 0.8 mL/L to the electrolytic solution.

With respect to the addition performed using the "Co-NS dispersion liquid" in the above-described case, the concentration of the Co-NS powder to be added to the electrolytic solution is preferably in a range of 0.1 to 5 mL/L. It is not preferable that the concentration is higher than this because dispersion is insufficient and uniform deposition is not obtained in the electrolysis in some cases. In addition, when the concentration is lower than this, a sufficient amount of deposition is not obtained within a practical time in the deposition by the electrolysis. As an electrolysis condition for the deposition, it is preferable to retain the electrically conductive substrate in a potential range of 1.2 V to 1.8 V vs. RHE. The deposition reaction does not progress at 1.2 V or lower, and it is not preferable that the potential is 1.8 V or higher, oxygen generation progresses simultaneously to inhibit the deposition.

In the alkaline water electrolysis method of the present invention, the electrode of the constitution having a particular catalyst layer described above needs to be used as the oxygen generation anode, but the cathode and the separator are not particularly limited, and those which have been used in conventional alkaline water electrolysis may appropriately be used. Hereinafter, these will be described.

[Cathode]

As the cathode, a substrate made of a material that is bearable to alkaline water electrolysis and a catalyst having a small cathode overpotential are preferably selected and used. As the cathode substrate, a nickel substrate, or a cathode substrate obtained by forming an active cathode by coating the nickel substrate can be used. Examples of the shape of the cathode substrate include an expanded mesh and a porous expanded mesh in addition to a plate shape.

The cathode material includes porous nickel having a large surface area, a Ni—Mo-based material, and the like. Besides, the cathode material includes Raney nickel-based materials, such as Ni—Al, Ni—Zn, and Ni—Co—Zn; sulfide-based materials, such as Ni—S; and hydrogen absorbing alloy-based materials, such as Ti$_2$Ni. The catalyst preferably has characteristics of low hydrogen overpotential, high stability against short-circuit, high poisoning resistance, and the like. As other catalysts, metals, such as platinum, palladium, ruthenium, and iridium, and oxides thereof are preferable.

[Separator]

As the electrolysis separator, any of conventionally known electrolysis separators, such as asbestos, non-woven fabric, an ion-exchange membrane, a porous polymer membrane, and a composite membrane of an inorganic substance and an organic polymer can be used. Specifically, an ion-permeable separator such that organic fiber cloth is incorporated in a mixture of a hydrophilic inorganic material, such as a calcium phosphate compound and calcium fluoride, and an organic binding material, such as polysulfone, polypropylene, and polyvinylidene fluoride, can be used. In addition, an ion-permeable separator such that stretched organic fiber cloth is incorporated in a film-forming mixture of an inorganic hydrophilic material in the form of particles, such as oxides and hydroxides of antimony and zirconium, and an organic binder, such as a fluorocarbon polymer, polysulfone, polypropylene, polyvinyl chloride, and polyvinyl butyral, can be used.

In the alkaline water electrolysis method of the present invention, a high-concentration alkali aqueous solution can be electrolyzed by using an alkaline water electrolysis cell using the oxygen generation anode that characterizes the present invention as a constitutional element. The alkali aqueous solution that is used as the electrolytic solution is preferably an aqueous solution of an alkaline metal hydroxide, such as potassium hydroxide (KOH) and sodium hydroxide (NaOH). The concentration of the alkali aqueous solution is preferably 1.5% by mass or more and 40% by mass or less. In addition, the concentration of the alkali aqueous solution is more preferably 15% by mass or more and 40% by mass or less because the electrical conductivity is large, and the electric power consumption can be suppressed. Further, when the cost, the corrosiveness, the viscosity, the operability, and the like are taken into consideration, the concentration of the alkali aqueous solution is preferably 20% by mass or more and 30% by mass or less.

[Operation Method]

The catalyst layer 6 of the anode can be formed before the anode is incorporated in the electrolytic cell. In the alkaline water electrolysis method of the present invention, the catalyst component can be deposited on the anode by suspending the nanosheet (Co-NS) that is a component for forming the catalyst layer 6 that characterizes the present invention in the common electrolytic solution to be supplied to the anode chamber and the cathode chamber that form the electrolytic cell, and, in such a state, starting electrolysis. Therefore, when the technique of the alkaline water electrolysis of the present invention is used, the recovery of the performance of the electrolytic cell lowered by operation can be performed without the time and labor for disassembling the electrolytic cell, and therefore the operation method is practical, and the industrial merit is extremely great.

EXAMPLES

Next, the present invention will be described more specifically giving Examples and Examination Examples.

Firstly, the state of deposition on the surface of an electrode and the effect of the deposition were examined in the case where the Co-NS that is a catalyst component that characterizes the present invention was dispersed in an electrolytic solution to perform electrolysis. The same tests were conducted also in the case where the nanosheet was not used for comparison.

Examination Example 1

The electrolysis operation was performed using a three-electrode cell made of PFA that is a fluororesin. The electrolysis was performed at 30±1° C. using a Ni wire etched with boiling hydrochloric acid for 6 minutes, a reversible hydrogen electrode (RHE), a Ni coil, and 250 mL of 1.0 M KOH aqueous solution as a working electrode, a reference electrode, a counter electrode, and an electrolytic solution, respectively. Firstly, cyclic voltammetry (0.5 to 1.5 V vs. RHE, 200 mVs$^{-1}$, 200 cycles) was performed as a pretreatment without adding the Co-NS dispersion liquid to the electrolytic solution. In the present example, a mixture obtained by mixing a 50 g/L Co-NS dispersion liquid obtained by the same method as described previously with the pre-treated electrolytic solution in a ratio of 0.8 mL/L was used as an electrolytic solution, and electrolysis of (1.68 V vs. RHE, 4 hours) was performed. By this operation, the Co-NS was oxidized on the surface of the electrode to deteriorate the dispersibility by the oxidation in the layer of the hydroxide of Co-NS and the oxidative decomposition of surface organic groups and deposit the Co-NS on the surface of the electrode, and thus a catalyst layer was formed. This anode is denoted as "Ni—Co-NS".

Figure 4:
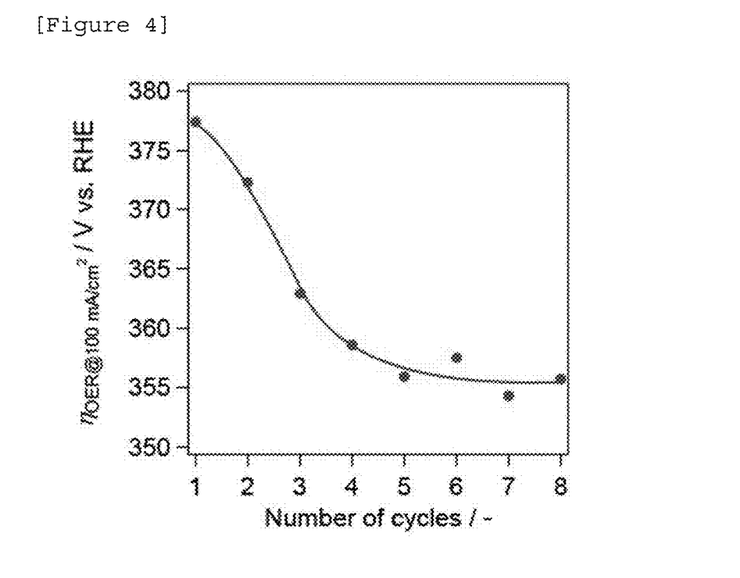
FIG. 4 is a graph showing a change in current-potential (change in catalytic activity) of a sample in a potential cycle in Examination Example 1.

FIG. 4 shows a change in activity during the formation of the catalyst layer, performed above, in Ni—Co-NS. When the operation of forming the catalyst layer including a potential sweep was repeated, the oxygen generation overpotential was gradually decreased to become almost constant at 8 times. From this, it is considered that a catalyst layer that is composed of the Co-NS and can exhibit good functions was formed on the surface of Ni of the anode Ni—Co-NS.

Figure 5:
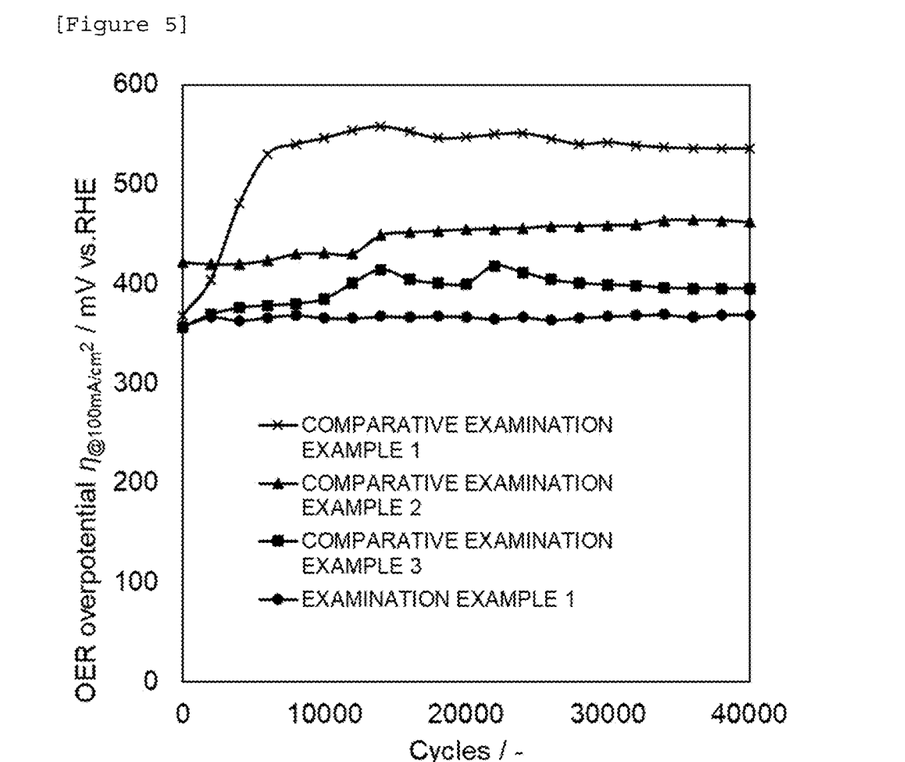
FIG. 5 is a graph showing results of an accelerated test in Examination Example 1, and a change in an electrolytic property in Comparative Examination Examples 1 to 3.

FIG. 5 shows potential fluctuation cycle dependency of the oxygen generation overpotential in the accelerated deterioration test conducted for the anode Ni—Co-NS obtained above. As shown in Examination Example 1 in FIG. 5, the overpotential of Ni—Co-NS was about 370 mV and constant, and the deterioration due to the potential cycle was not observed.

Comparative Examination Example 1

An experiment was conducted in the same manner as described above, except that the catalyst was not added to the electrolytic solution. As shown in FIG. 5, the anode catalyst was only Ni in this case, and the initial overpotential was about 370 mV, which was about the same as the overpotential of Ni—Co-NS, but the overpotential increased significantly with the progress of cycles and was about 550 mV at 10000 cycles or more.

Comparative Examination Example 2

A mixture obtained by adding 0.2 mL of a 0.66 M Co(NO$_3$)$_2$ solution as a catalyst to the electrolytic solution was used as Ni—Co(No$_3$)$_2$, and an experiment was conducted in the same manner as the experiment conducted in Examination Example 1. As shown in FIG. 5, the overpotential was increased gradually from 420 mV to 460 mV in Ni—Co(No$_3$)$_2$. From this, it is inferred that nickel hydroxide spontaneously formed on the surface of the Ni electrode is also a highly active electrode catalyst, but lost activity because transfer from the p phase to the a phase and a change into a hydrated oxide occurred due to the oxidation-reduction reaction of nickel with potential fluctuation.

Comparative Examination Example 3

Potential fluctuation cycle dependency of the oxygen generation overpotential at the time when the accelerated deterioration test with an electrolytic solution in which the Co-NS was not added was conducted using an anode having a catalyst layer composed of the Co-NS formed on the surface of Ni in the same manner as in Examination Example 1 was examined. As shown in FIG. 5, it was ascertained that the initial overpotential was about 370 mV, but the overpotential increased gradually up to 400 mV.

Examination Example 2

An anode was prepared by performing electrolysis in the same manner as in Examination Example 1 using an electrolytic solution in which the Co-NS dispersion liquid was dissolved. In the present example, electrolysis with cyclic voltammetry (−0.7 to 0.5 V vs. RHE, 500 mVs$^{-1}$, 2000 cycles) was repeated 21 times to load voltage fluctuation up to 40000 times.

Figure 6:
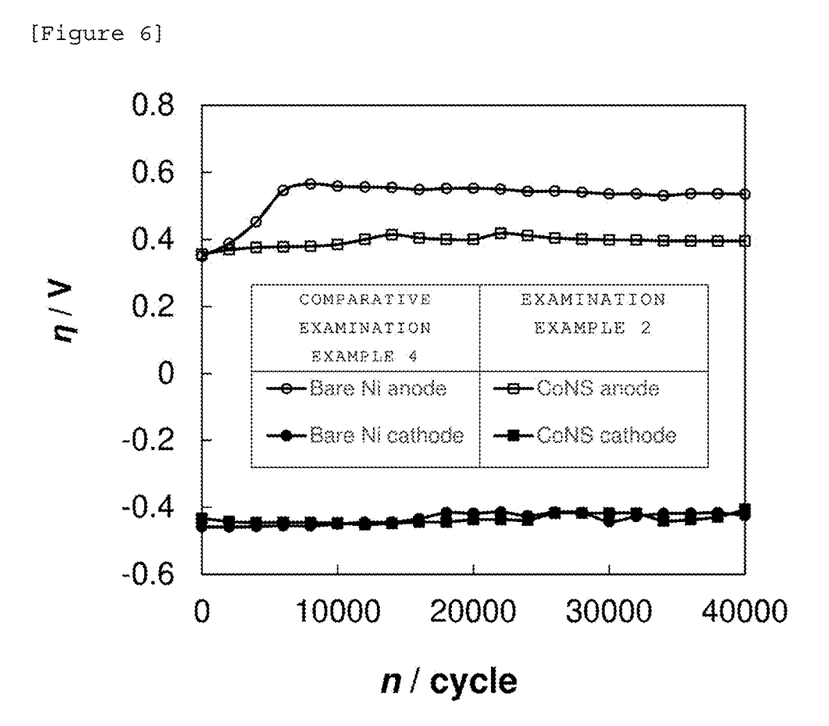
FIG. 6 is a graph showing changes in an oxygen generation reaction property and a hydrogen generation reaction property in an accelerated test.

FIG. 6 shows changes in hydrogen generation and oxygen generation overpotentials at $|i|=100$ mA/cm$^2$ versus the number of potential cycles. In the anode of Examination Example 2, the increase in the overpotential was able to be suppressed and the enhancement in the durability by the Co-NS was ascertained. On the other hand, as shown in FIG. 6, from the results of Examination Example 2 and Comparative Examination Example 4 which will be mentioned later, it was found that in the cathode, the overpotential was 0.40 to 0.45 V irrespective of whether the Co-NS was present or not, and the Co-NS dispersed in the electrolytic solution did not give any influence on the cathode.

Comparative Examination Example 4

FIG. 6 shows results of conducting a test using a Ni anode in the same manner as in Examination Example 2. As shown in FIG. 6, an increase in the overpotential of the anode versus the number of potential cycles was able to be ascertained.

Examination Example 3

Figure 7:
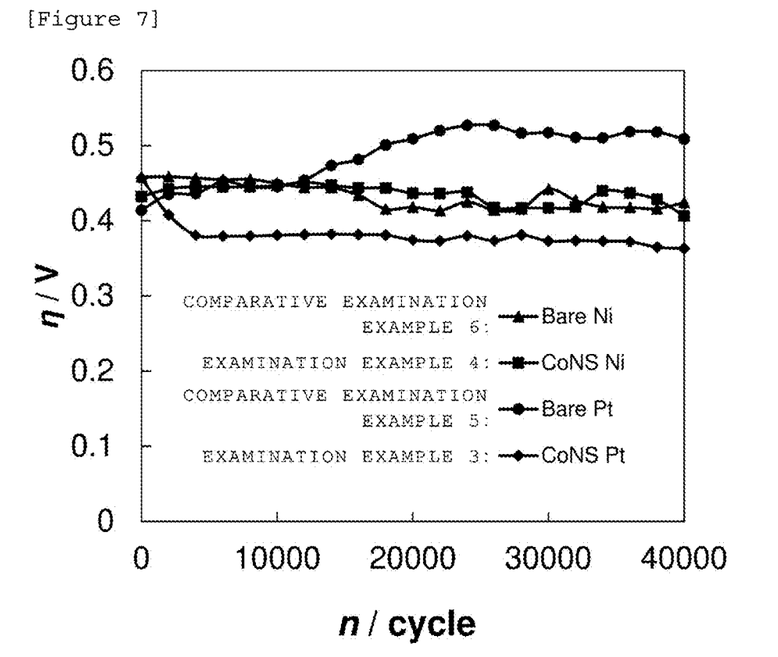
FIG. 7 is a graph showing a change in a hydrogen generation reaction property in an accelerated test.

Evaluation was performed by conducting an electrolysis test under the same condition as in Examination Example 2 dissolving the Co-NS dispersion liquid in the electrolytic solution in the same manner as in Examination Example 1 and using a platinum plate (Bare-Pt). FIG. 7 shows a change in hydrogen generation overpotential at $|i|=100$ mA/cm$^2$ versus the number of potential cycles. As shown in FIG. 7, the overpotential lowered gradually from 0.46 V to 0.37 V.

Comparative Examination Example 5

A test was conducted under the same condition as in Examination Example 2 using a platinum wire (Bare-Pt) without dissolving the Co-NS dispersion liquid in the electrolytic solution. FIG. 7 shows a change in hydrogen generation overpotential at $|i|=100$ mA/cm$^2$ versus the number of potential cycles. As shown in FIG. 7, with respect to Bare-Pt, the overpotential increased gradually from 0.4 V to 0.5 V.

Examination Example 4

Evaluation was performed by conducting a test under the same condition as in Examination Example 2 dissolving the Co-NS dispersion liquid in the electrolytic solution and using a Ni cathode. FIG. 7 shows a change in hydrogen generation overpotential at $|i|=100$ mA/cm$^2$ versus the number of potential cycles. As shown in FIG. 7, the overpotential was stabilized at about 0.43 V.

Comparative Examination Example 6

A test was conducted under the same condition as in Examination Example 2 using a Ni cathode without dissolving the Co-NS dispersion liquid in the electrolytic solution. FIG. 7 shows a change in hydrogen generation overpotential at $|i|=100$ mA/cm$^2$ versus the number of potential cycles. As shown in FIG. 7, the overpotential of the Ni cathode was 0.4 to 0.45 V, and the effect by the addition of the Co-NS dispersion liquid, which was ascertained in Examination Example 4, was not ascertained.

Examination Example 5

Figure 8:
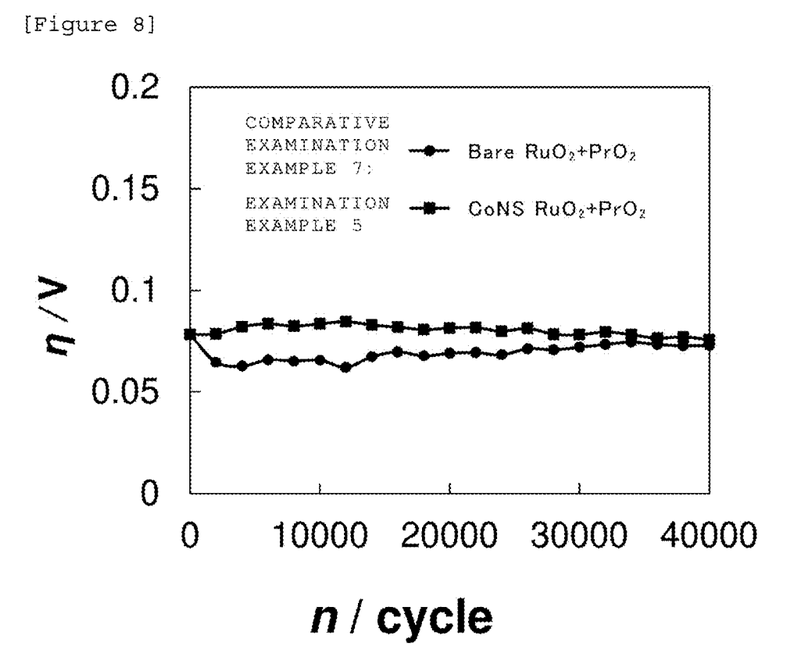
FIG. 8 is a graph showing a change in a hydrogen generation reaction property in an accelerated test.

Evaluation was performed by conducting a test in the same manner as in Examination Example 2, except that an active cathode having a catalyst composed of a composite oxide of Ru and Pr, the catalyst formed on the surface thereof, was used. FIG. 8 shows a change in hydrogen generation overpotential at $|i|=100$ mA/cm$^2$ versus the number of potential cycles. As shown in FIG. 8, the overpotential of the active cathode was retained at about 75 mV.

Comparative Examination Example 7

A test which was the same as the test in Examination Example 5 was conducted using the active cathode of Examination Example 5 without dissolving the Co-NS dispersion liquid in the electrolytic solution. FIG. 8 shows a change in hydrogen generation overpotential at $|i|=100$ mA/cm$^2$ versus the number of potential cycles. As shown in FIG. 8, the overpotential of the active cathode initially decreased to about 60 mV, but was then retained at about 75 mV, and was almost the same level as the overpotential in Examination Example 5 after 40000 times.

Example 1

A nickel expanded mesh (10 cm×10 cm, LW×3.7 SW×0.9 ST×0.8 T) on which a chemical etching treatment was performed by immersing the nickel expanded mesh in 17.5% by mass hydrochloric acid at near the boiling point for 6 minutes was used an anode substrate. This expanded mesh was subjected to a blast treatment (0.3 MPa) with alumina particles of 60 mesh, and was then immersed in 20% by mass hydrochloric acid to perform a chemical etching treatment at near the boiling point for 6 minutes. An aqueous solution containing a component to be a precursor of a lithium-containing nickel oxide was applied, with a brush, on the surface of the anode substrate after the chemical etching treatment, and was then dried at 80° C. for 15 minutes. Subsequently, the anode substrate was subjected to a thermal treatment under the atmosphere at 600° C. for 15 minutes. The treatments from the application of the aqueous solution to the thermal treatment were repeated 20 times to obtain an intermediate product having an intermediate layer (composition: $Li_{0.5}Ni_{1.5}O_2$) formed on the surface of the anode substrate.

Next, a Ni—Co-NS anode was obtained in the same manner as described previously in Examination Example 1 by adding 50 g/L of the Co-NS dispersion liquid to the electrolytic solution in a ratio of 1 mL/L and forming a catalyst layer composed of the Co-NS on the surface of the above-described intermediate product. A small-sized zero-gap type electrolytic cell using a neutral separator was prepared using the resultant anode, a separator (Zirfon manufactured by AGFA-Gevaert NV), and an active cathode having a catalyst layer formed on the surface thereof, the catalyst layer composed of a composite oxide of Ru and Ce. The area of the electrodes was set to 19 cm$^2$.

A 25% by mass KOH aqueous solution in which the Co-NS dispersion liquid, which is the same as the one used in Examination Example 1, was added in a ratio of 1 mL/L was used as the electrolytic solution, and was supplied to the anode chamber and the cathode chamber, that form the electrolytic cell, to perform electrolysis at a current density of 6 kA/m$^2$ for 6 hours in each chamber. Subsequently, the anode and the cathode were brought into a short-circuit state (0 kA/m$^2$), and the temperature was lowered to suspend the electrolysis for 15 hours. A shutdown test in which the operation from the electrolysis to the suspension was defined as 1 cycle was conducted. As a result, it was able to be ascertained that stabilization was achieved at a given voltage in the tests of 20 times.

Comparative Example 1

A test which is the same as the test conducted in Example 1 was conducted with the same electrolytic cell as the electrolytic cell used in Example 1 without adding the Co-NS to the electrolytic solution to be supplied to the anode chamber and the cathode chamber that form the electrolytic cell. As a result, the cell voltage gradually increased as the number of times of suspension increased, and therefore the superiority in the constitution of Example 1 was ascertained.

INDUSTRIAL APPLICABILITY

The oxygen generation anode that characterizes the present invention is suitable as, for example, an alkaline water electrolysis anode that forms electrolysis equipment or the like using electric power having a large output fluctuation, such as renewable energy, as a power source. Specifically, by constituting an electrolytic cell as described in the present invention, and supplying a common electrolytic solution in which a hybrid cobalt hydroxide nanosheet (Co-NS) being a catalyst component of the anode to an anode chamber and a cathode chamber that form an electrolytic cell to perform electrolysis, performing alkaline water electrolysis in which the electrolysis performance is unlikely to be deteriorated and which is stable over a long period of time can be realized even when electric power having a large output fluctuation, such as renewable energy, is used as a power source.

REFERENCE SIGNS LIST

2 Electrically conductive substrate
4 Intermediate layer
6 Catalyst layer
10 Alkaline water electrolysis anode

The invention claimed is:
1. An alkaline water electrolysis method comprising supplying an electrolytic solution obtained by dispersing a catalyst comprising a hybrid cobalt hydroxide nanosheet (Co-NS) being a composite of a metal hydroxide and an organic substance to an anode chamber and a cathode chamber that form an electrolytic cell, and using the electrolytic solution for electrolysis in each chamber in common.

2. The alkaline water electrolysis method according to claim 1, wherein the Co-NS has a layered molecular structure having a size of 10 to 100 nm.

3. The alkaline water electrolysis method according to claim 1, wherein a Co-NS dispersion liquid having a concentration of 10 to 100 g/L is used as the electrolytic solution obtained by dispersing the Co-NS, and the concentration of the Co-NS dispersion liquid added to the electrolytic solution is adjusted in such a way as to be within a range of 0.1 to 5 mL/L.

4. An alkaline water electrolysis method comprising:
supplying an electrolytic solution obtained by dispersing a catalyst comprising a hybrid cobalt hydroxide nanosheet (Co-NS) being a composite of a metal hydroxide and an organic substance to an anode chamber and a cathode chamber that form an electrolytic cell, and using the electrolytic solution for electrolysis in each chamber in common; and
performing electrolytic deposition of the Co-NS in the electrolytic cell during operation to electrolytically deposit the Co-NS on a surface of an electrically conductive substrate that forms an oxygen generation anode and has the catalyst layer formed on a surface thereof, thereby recovering and improving electrolysis performance.

5. The alkaline water electrolysis method according to claim 4, wherein a condition of electrolytically depositing the Co-NS is to retain the electrically conductive substrate in a potential range of 1.2 to 1.8 V vs. RHE.

6. An alkaline water electrolysis anode that performs oxygen generation, the alkaline water electrolysis anode comprising:
an electrically conductive substrate having a surface comprising nickel or a nickel base alloy;
an intermediate layer formed on the surface of the electrically conductive substrate, the intermediate layer comprising a lithium-containing nickel oxide represented by compositional formula $Li_xNi_{2-x}O_2$ wherein $0.02 \leq x \leq 0.5$; and
a catalyst layer formed on a surface of the intermediate layer, the catalyst layer comprising a hybrid cobalt hydroxide nanosheet (Co-NS) being a composite of a metal hydroxide and an organic substance.

* * * * *